US012772309B2

(12) United States Patent
Lee et al.

(10) Patent No.: US 12,772,309 B2
(45) Date of Patent: Oct. 20, 2026

(54) HOME DEVICE INTEROPERABILITY

(71) Applicant: Apple Inc., Cupertino, CA (US)

(72) Inventors: Christopher J. Lee, Los Altos, CA (US); Andreas I. Gal, Portola Valley, CA (US); Keith W. Rauenbuehler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/595,302

(22) Filed: Mar. 4, 2024

(65) Prior Publication Data

US 2025/0063615 A1 Feb. 20, 2025

Related U.S. Application Data

(60) Provisional application No. 63/532,668, filed on Aug. 14, 2023.

(51) Int. Cl.
*H04W 76/14* (2018.01)
*H04L 67/104* (2022.01)

(52) U.S. Cl.
CPC ........... *H04W 76/14* (2018.02); *H04L 67/104* (2013.01)

(58) Field of Classification Search
CPC ............................. H04W 76/14; H04L 67/104
USPC ........................................................ 709/227
See application file for complete search history.

(56) References Cited

U.S. PATENT DOCUMENTS

2014/0372551 A1* 12/2014 Fleck .................... H04W 8/005 709/213
2015/0222517 A1* 8/2015 McLaughlin ........... H04L 67/02 713/171
2018/0091381 A1* 3/2018 McLaughlin ....... H04L 12/2823
2018/0091506 A1 3/2018 Chow et al.
2019/0372838 A1 12/2019 Travostino et al.
2020/0117149 A1* 4/2020 Marti .................. H04L 12/2816
2022/0201429 A1* 6/2022 Schoenberg .......... H04W 4/023

OTHER PUBLICATIONS

International Search Report and Written Opinion from PCT/US2024/041835, dated Nov. 20, 2024, 12 pages.
International Preliminary Report on Patentability from PCT/US2024/041835 dated Feb. 26, 2026, 9 pages.
European Office Action in Application No. 24762523.9 dated Jul. 7, 2026 in 4 pages.

* cited by examiner

*Primary Examiner* — Jeffrey R Swearingen
(74) *Attorney, Agent, or Firm* — BAKERHOSTETLER

(57) ABSTRACT

An electronic device may include a processor configured to receive, over a local area network and from an accessory electronic device connected to the local area network, a request to register with the electronic device. The processor may also be configured to register the accessory electronic device for a service provided by the electronic device based on the request, and receive, from the accessory electronic device, a request to access the service. The processor may further be configured to provide, over the local area network and to the accessory electronic device, access to the service.

20 Claims, 4 Drawing Sheets

HOME DEVICE INTEROPERABILITY

CROSS-REFERENCE TO RELATED APPLICATIONS

The present application claims the benefit of U.S. Provisional Patent Application Ser. No. 63/532,668, entitled "HOME DEVICE INTEROPERABILITY," filed Aug. 14, 2023, which is hereby incorporated herein by reference in its entirety and made part of the present U.S. Utility Patent Application for all purposes.

TECHNICAL FIELD

The present description relates generally to device interoperability, including interoperability of devices within a local area network, such as a network of devices in a home.

BACKGROUND

Multiple different devices in a home may be communicably coupled together to form a home network. For example, a home network environment may include a smart thermostat, smart switches, smart light bulbs, and the like.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
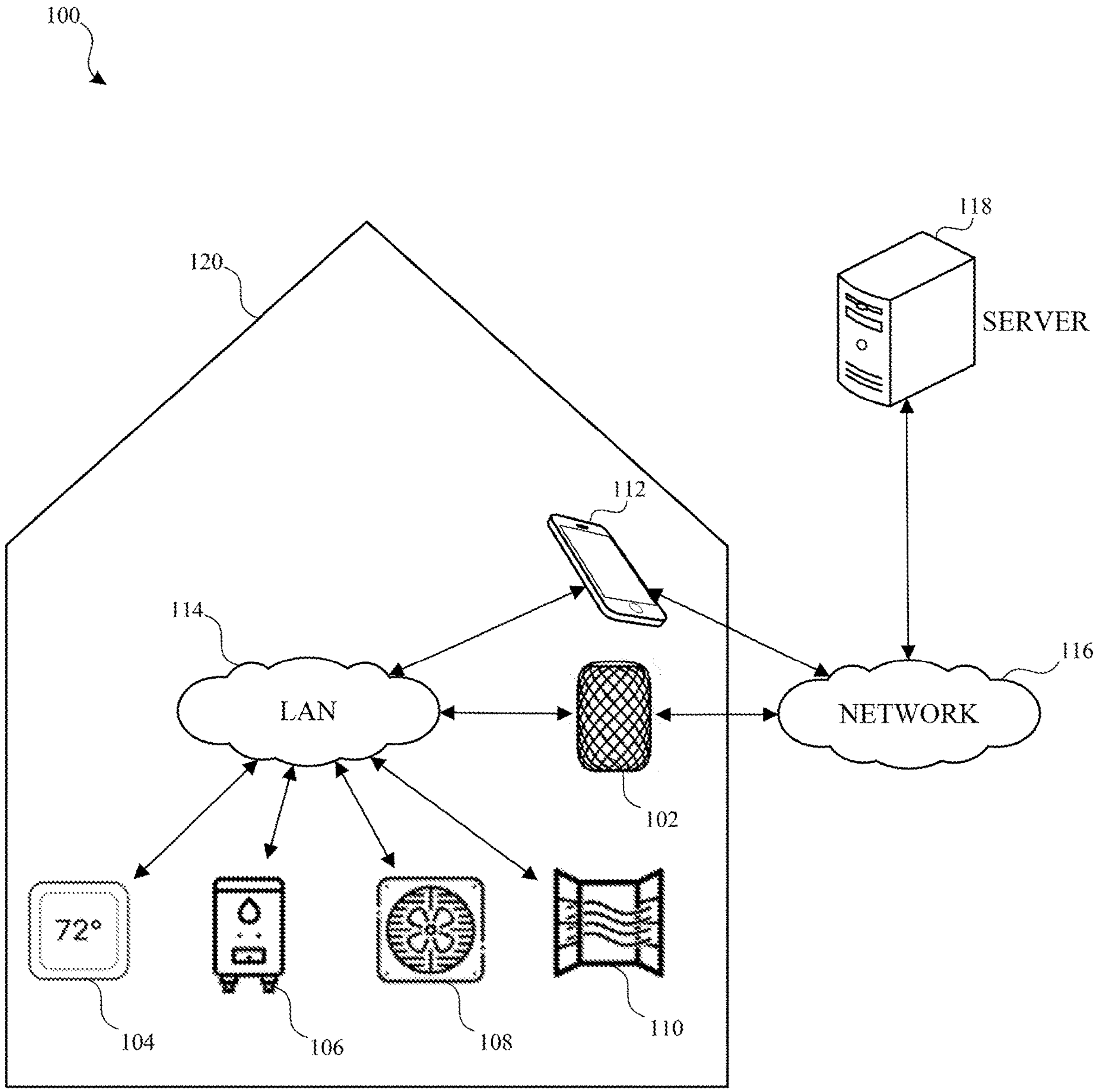
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A home network environment may include one or more resident electronic devices and one or more accessory electronic devices. A resident electronic device may be an electronic device that is configured to establish a connection with a local area network within the home and provide a toolkit and/or framework for communication, services, and/or interoperability of accessory electronic devices. For example, the resident electronic device may facilitate forming mesh and/or peer-to-peer network connections with accessory electronic devices in the home network environment, and through the established network connections may provide access to information and/or services to the accessory electronic devices. Example resident electronic devices may include set-top boxes, media players, smart speakers, tablet devices, mobile devices, and the like, while example accessory electronic devices may include smart light bulbs, smart thermostats, smart locks, smart sensors, and the like.

In one or more implementations, an accessory electronic device may utilize low power short range communication protocols, such as Bluetooth low energy (BLE), BLE Long Range, Zigbee, Matter, Thread, and the like, to establish the network connections with each other and/or one or more of the resident electronic devices. In one or more implementations, the accessory electronic devices may not have access to a wide area network, such as the Internet, while the resident electronic devices may have access to such a wide area network.

For example, a smart home of a user may include accessory electronic devices such as a smart thermostat, smart light bulbs, smart sprinkler system, smart alarm system, and the like. A smart thermostat may be configured to control the temperature based on an activity state of the user (e.g., home, away, sleep, etc.). The thermostat may be used to control other accessory electronic devices in the home such as, for example, a furnace. The furnace may be instructed by the thermostat to heat the home to a set temperature. The furnace may operate believing that it is the only accessory in the house capable of heating the house, and thus may operate at full utilization. However, there may be other factors that may make the furnace operate more efficiently if the thermostat and/or the furnace had access to additional information regarding other accessory devices operating in the home network environment.

The subject system provides a framework and/or toolkit for an integrated network of accessory and resident electronic devices. The subject system preserves user privacy by primarily relying on the exchange of data through local network communications, without the need for accessory electronic devices to communicate externally, such as over a wide area network. In this manner, resident electronic devices may operate as a local server that can aggregate information from and allow that information to be accessed by accessory electronic devices within the local network. In addition, data outside of the local network may be obtained by resident electronic devices on behalf of accessory electronic devices that are associated with the resident electronic devices. The subject system also provides for enhanced usability by utilizing APIs or other low-level functions (e.g., at the system or firmware level) to facilitate communication and/or control between resident and accessory electronic devices.

The subject system may allow resident and accessory electronic devices of the same and/or different manufacturers to communicate with each other to receive notifications and/or information regarding activity within the home network. For example, an accessory electronic device, such as the smart thermostat, may be associated with a resident electronic device (or be registered with the same user account as the resident electronic device) that manages and/or facilitates management of the home network environment, such as a home hub, a smart speaker, a tablet device, a set-top box device, and the like. The resident electronic device may provide the associated accessory electronic devices with access to one or more services, such as via an API, toolkit, framework, or the like. A service may allow an accessory electronic device, such as a smart thermostat, to receive information and/or notifications regarding one or more other accessory electronic devices in the home, such as a floor heating system. In this manner, accessory electronic devices may cooperate with each other. For example, the smart thermostat that controls the furnace can coordinate with, and/or be aware of, the floor heating system that also heats the home and adjust its utilization to operate more efficiently.

The subject system may also allow resident and/or accessory electronic devices of the same and/or different manufacturers to communicate with each other to receive information and/or notifications regarding activity outside of the home network. For example, an accessory electronic device, such as an air conditioner, may be associated with a resident electronic device, such as a home hub, that provides access to one or more services. A service provided by a resident electronic device may allow the air conditioner to utilize (e.g., access) information obtained by the resident electronic device from one or more sources remote from the home, such as a server reporting the load of the energy grid and/or energy quality (e.g., renewable or non-renewable) powering the home. In this manner, the air conditioner can coordinate with other accessory electronic devices, such as ceiling fans, to cool the home and adjust its utilization to operate such that the home's overall power consumption is reduced when the service reports that the energy grid is experiencing high demand and/or that the energy grid is utilizing a threshold amount of non-renewable energy.

The subject system may also allow resident and/or accessory electronic devices of the same and/or different manufacturers to communicate with each other to execute one or more operations on one or more resident and/or accessory electronic devices. For example, an accessory electronic device, such as an air conditioner, may be associated with a resident electronic device, such as a smart speaker, that provides access to one or more services. The service may receive one or more status signals from an air conditioner, such as error codes, status codes, and the like. If a status signal indicates an error with the air conditioner, for example, the service may initiate a communication session (e.g., instant message, phone call, etc.) on a resident electronic device with a servicer or manufacturer to provide diagnostic information, coordinate a repair, and the like, without the accessory electronic device having to communicate with external servers thereby preserving user privacy.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes resident electronic devices 102 and 112 (collectively, "the resident electronic devices 102, 112"), a local area network ("LAN") 114, a network 116, the accessory electronic devices 104, 106, 108, 110 (collectively, "the accessory electronic devices 104-110"), and one or more remote service(s) (hereinafter "the server 118"). In one or more implementations, the resident electronic devices 102, 112 and the accessory electronic devices 104-110 may be part of a home network environment 120, and the LAN 114 may communicatively (directly or indirectly) couple any two or more of the resident electronic devices 102, 112 within the home network environment 120. Moreover, the network 116 may communicatively (directly or indirectly) couple any of the resident electronic devices 102, 112 with the server 118, for example, in conjunction with the LAN 114. One or more of the accessory electronic devices 104-110 may be configured to communicate via a peer-to-peer connection with each other and/or one or more of the resident electronic devices 102, 112. In one or more implementations, one or more of the accessory electronic devices 104-110 may not be configured to communicate via the LAN 114.

In one or more implementations, the LAN 114 may include one or more different network devices, network mediums, and/or may utilize one or more different wireless and/or wired network technologies, such as Ethernet, optical, Wi-Fi, Bluetooth, Zigbee, Matter, Powerline over Ethernet, coaxial, Ethernet, Z-Wave, cellular, or generally any wireless and/or wired network technology that may communicatively couple two or more devices. In one or more implementations, the network 116 may be an interconnected network of devices that may include, and/or may be communicatively coupled to, the Internet. For explanatory purposes, the network environment 100 is illustrated in FIG. 1 as including the resident electronic devices 102, 112, the accessory electronic devices 104-110, and the server 118; however, the network environment 100 may include any number of electronic devices and any number of servers.

One or more of the resident electronic devices 102, 112 may be, for example, a portable computing device such as a laptop computer, a smartphone, a smart speaker, a peripheral device (e.g., a digital camera, headphones), a digital media player, a tablet device, a wearable device such as a smartwatch or a band, a set-top box device, or any other appropriate device that includes one or more wired or wireless interfaces for communicating via the LAN 114 and/or the network 116, such as WLAN radios, cellular radios, and the like.

One or more of the accessory electronic devices 104-110 may be, for example, a connected home device, such as a wireless camera, a wireless access device (e.g., a smart lock), a smart thermostat, smart light bulbs, home security devices (e.g., motion sensors, door/window sensors, etc.), smart outlets, smart switches, and the like, or any other appropriate device that includes and/or is communicatively coupled to, for example, one or more wired or wireless interfaces, for establishing a peer-to-peer connection with one or more of the resident electronic devices 102, 112, such as Powerline Ethernet interfaces, WLAN radios, cellular radios, Bluetooth radios, Zigbee radios, near field communication (NFC) radios, and/or other wireless radios. In some implementations, the accessory electronic devices 104-110 may be connected to the network 116 but their ability to communicate with remote devices (e.g., the server 118) may be controlled by one or more resident electronic devices 102, 112 (e.g., by instructions to the accessory electronic devices 104-110 and/or by instructions to one or more network devices, such as a router). For example, a resident electronic device may instruct a router to block an accessory electronic device from accessing the Internet. In some implementations, the accessory electronic devices 104-110 may not be directly connected to the network 116 and may only obtain information originating beyond the LAN 114 via one or more resident electronic devices 102, 112, thus reducing the need for, e.g., certain network communication hardware from accessory electronic devices 104-110.

By way of example, in FIG. 1, the resident electronic device 102 is depicted as a smartphone, the resident electronic device 112 is depicted as a smart speaker, the accessory electronic device 104 is depicted as a thermostat, the accessory electronic device 106 is depicted as a furnace or furnace controller, the accessory electronic device 106 is depicted as an air conditioner or an air conditioner controller, and the accessory electronic device 110 is depicted as a window sensor (e.g., to determine whether a window is open or closed). One or more of the resident electronic devices 102, 112, and/or the accessory electronic devices 104-110 may be, and/or may include all or part of, the electronic device discussed below with respect to FIG. 2, and/or the electronic system discussed below with respect to FIG. 6.

In one or more implementations, one or more of the resident electronic devices 102, 112, and/or the accessory electronic devices 104-110 may be registered and/or associated with a user account. For example, an electronic device (e.g., the resident electronic device 102) may be directly registered and authenticated with the user account. Directly registering and authenticating with the user account may include the device storing account credentials (e.g., keys or tokens), allowing the electronic device to directly access account-based services and/or data. Directly registering an electronic device with a user account may also or instead include server-based (e.g., cloud-based) registration, where the device (e.g., an accessory device) connects to the user account at a server (e.g., via a resident device), such as the server 118, which may store account information (e.g., account, handles, or any other account-specific data) and associate the device with the user account.

In one or more implementations, one or more of the resident electronic devices 102, 112, and/or the accessory electronic devices 104-110 may be registered and/or associated with the home network environment 120, independent of any particular user account. For example, an electronic device (e.g., an accessory electronic device) may be recognized by one or more other electronic devices (e.g., resident electronic devices) but does not store or directly interact with the credentials of the user account. The association may be managed by the other electronic devices that are already registered and/or associated with the user account. For example, the resident electronic device 112 registered with a user account may recognize (e.g., via Bluetooth transmissions) the accessory electronic device 104 and may choose (e.g., via user instruction) to be associated with the accessory electronic device 104. The association between the accessory electronic device 104 and the resident electronic device 112 may exist within the home network environment 120 and may not be directly registered with the user account at the server 118.

In one or more implementations, one or more of the resident electronic devices 102, 112, and/or the accessory electronic devices 104-110 may be indirectly associated with a user account and/or another electronic device. For example, the accessory electronic device 104 may be provided or may obtain (e.g., by or from the resident electronic device 112) a key or token associated with the user account for directly uploading sensor data to a storage volume associated with the user account on the server 118, but the accessory electronic device 104 relies upon the resident electronic device 112 for other network-based tasks.

In one or more implementations, electronic devices associated with the user account may effectively become resident electronic devices in the home network environment 120 when the electronic devices are connected to the LAN 114. For example, the resident electronic device 112 may be smartphone that routinely leaves the home and may become a resident electronic device when it reconnects to the LAN 114.

Since, in one or more implementations, one or more of the accessory electronic devices 104-110 cannot connect to the LAN 114, the user may register and/or associate one or more of the accessory electronic devices 104-110 to their user account with one of the resident electronic devices 102, 112. For example, the resident electronic device 102 may establish a peer-to-peer connection with the accessory electronic device 106, such as via BLE, and may then associate the accessory electronic device 106 with the user account associated with the resident electronic device 102.

In one or more implementations, one or more of the resident electronic devices 112 may be associated with a different user account than the other resident electronic devices 102 (such as the user account of a neighbor, a user account of family member, a user account of a transient visitor, and the like), and may be granted access, such as via the user account associated with one or more of the other resident electronic devices 102, to control and/or relay instructions to one or more of the accessory electronic devices 104-110. Thus, in one or more implementations, a neighbor's electronic device that is not physically located in the same location as the home network environment 120 may be used as a resident electronic device for the home network environment 120 by relaying commands from a remote electronic device to one or more of the accessory electronic devices 104-110 within the home network environment 120.

In one or more implementations, one or more of the resident electronic devices 102, 112 may opt in to operate as resident electronic devices in one or more network environments that include one or more other resident electronic devices that are associated with a trusted user account, such as a user account that is in the same sharing group (e.g., a same family group) as the user account associated with the one or more of the resident electronic devices 102, 112, a user account associated with a contact of the user account associated with the one or more of the resident electronic devices 102, 112, and/or generally any trusted user account. This way, one or more of the resident electronic devices 102, 112 may also be resident electronic devices in one or more other home network environments.

In one or more implementations, access control lists, access control rules, and/or profiles may be used to automatically manage granular access to resources, such as access to one or more of the resident electronic devices 102, 112 and/or accessory electronic devices 104-110, and may be triggered by one or more of location, time, and/or other factors. For example, a profile with an administrative privilege may have complete access to control all accessory electronic devices 104-110, whereas a profile without the administrative privilege may only have limited access to control particular accessory electronic devices 104-110.

In the subject system, the resident electronic devices 102, 112 may offer one or more services to the associated accessory electronic devices 104-110.

One such service may include information sharing. A resident electronic device may obtain information from outside of the home network environment 120 for providing to (or that may be accessed by) one or more of the accessory electronic devices 104-110 and/or other resident electronic devices. For example, the resident electronic device 102 may periodically obtain sunrise and sunset information that one or more lights may access for their knowledge, which may be an accessory electronic device (not depicted). A resident electronic device may also or instead obtain information from inside of the home network environment 120 that may be accessed by one or more of the accessory electronic devices 104-110 and/or other resident electronic devices. For instance, the resident electronic device 102 may periodically obtain data from the accessory electronic device 110 (e.g., window sensors), and the accessory electronic device 104 (e.g., thermostat) may obtain window sensor data from the resident electronic device 102 to optimize indoor temperature and/or energy utilization by disabling climate control if the window sensor data indicates that the windows are open.

Another service may include device control. An accessory electronic device may send control commands to other devices (e.g., resident and/or accessory) via a resident electronic device. For instance, a smart lighting system may reduce brightness based on feedback from smart blinds, all communicated and controlled through the resident electronic device 102.

Another service may include notifications. An accessory electronic device may send and/or receive alerts through a resident electronic device. For instance, a door sensor could notify a resident electronic device of a breach, and the resident electronic device may alert other accessory electronic devices in the network to act, for example, by sounding an alarm or turning on lights. As another example, an accessory electronic device may request that a resident electronic device trigger a notification to the accessory electronic device in the event that predetermined conditions are met, such as another accessory electronic device detects that the internal temperature of the home has reached a particular level.

Another service may include payment functionality. An accessory electronic device can facilitate payments via one or more of the resident electronic devices 102, 112. For instance, an accessory electronic device (e.g., a smart refrigerator) may identify the need for repairs and communicate the need for repairs with the resident electronic device 112 for the resident electronic device 112 to obtain payment approval from the user and to initiate a service request.

In some implementations, the user associated with the resident electronic devices 102, 112 may grant or deny an accessory electronic device access to any of the services (e.g., via an opt-in process during the association process). Additionally or alternatively, the resident electronic device providing a service to an accessory electronic device may cross reference an identifier (e.g., product type, product stock keeping unit (SKU), key, token, etc.) of the accessory electronic device with a list of accessory electronic device identifiers and permitted services corresponding to each accessory electronic device identifier. The list may be obtained (e.g., periodically) by the resident electronic device (e.g., from a remote server). For example, the remote server may maintain a list of accessory electronic devices 104-110 in the home network environment 120 along with the services that may be provided to (or accessed by) each accessory electronic device to prevent the accessory electronic devices 104-110 from accessing services irrelevant to the use of the accessory electronic device.

For explanatory purposes, FIG. 1 is described herein with respect to a home network environment 120. However, it is contemplated that the home network environment may be implemented in a business network environment, or generally in any network environment that includes one or more resident electronic devices 102, 112 and one or more accessory electronic devices 104-110. In addition, information sharing, device control, notifications, and payments are example services and are not intended to be limiting. Other services that may be provided to (or accessed by) one or more of the accessory electronic devices 104-110 by (or via) one or more of the resident electronic devices 102, 112 are contemplated.

Figure 2:
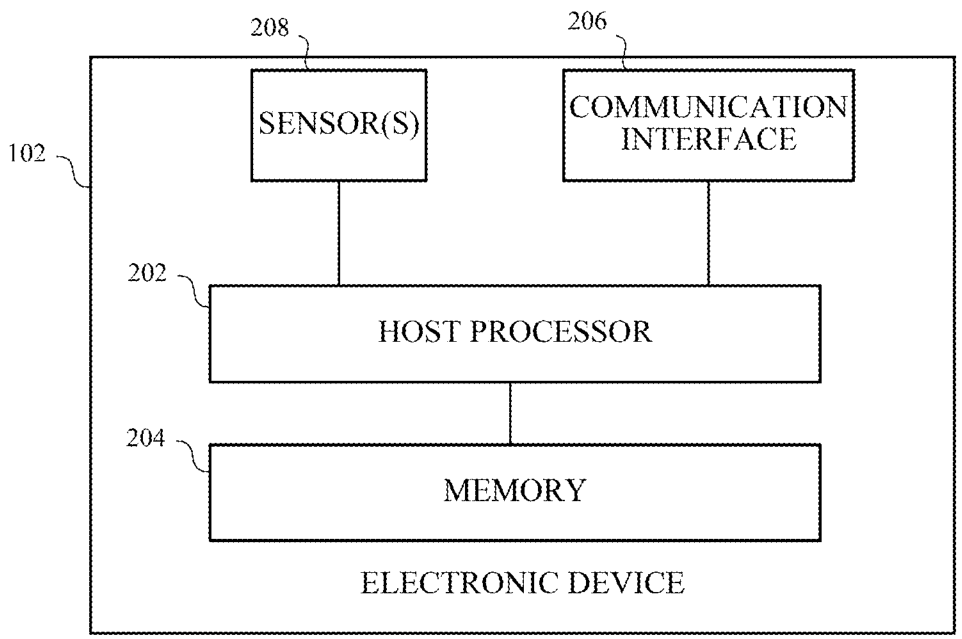
FIG. 2 illustrates an example electronic device that may implement the subject methods and systems, in accordance with one or more implementations.

FIG. 2 illustrates an example electronic device 102 that may implement the subject methods and systems, in accordance with one or more implementations. For explanatory purposes, the resident electronic device 102 is illustrated in FIG. 2. However, one or more of the components of the resident electronic device 102 may also be implemented by one or more of the other resident electronic devices 112, one or more of the accessory electronic devices 104-110, and/or the server 118 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The resident electronic device 102 may include a processor 202, a memory 204, a communication interface 206, and one or more sensor(s) 208. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 206 may include suitable logic, circuitry, and/or code that enables wired or wireless communication, such as between any of the resident electronic devices 102, 112, the companion electronic device 109, the accessory electronic devices 104-110, and/or the server 118 over the network 116 (e.g., in conjunction with the LAN 114), and/or via peer-to-peer communications. The communication interface 206 may include, for example, one or more of a Bluetooth communication interface, a cellular interface, an NFC interface, a Zigbee communication interface, a WLAN communication interface, a USB communication interface, or generally any communication interface. In one or more implementations, the communication interface 206 may include a Bluetooth-WLAN combination interface, such as when implemented by one or more of the resident electronic devices 102, 112, while the communication interface 206 may include only a Bluetooth interface when implemented by one or more of the accessory electronic devices 104-110 such that the accessory electronic devices 104-110 may not connect to the public internet (e.g., network 116).

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

The sensor(s) 208 may include various types of sensors that can measure different physical or environmental parameters. Some of the types of sensors 208 include temperature sensors, humidity sensors, motion sensors, light sensors, sound sensors, and/or air quality sensors.

Figure 3:
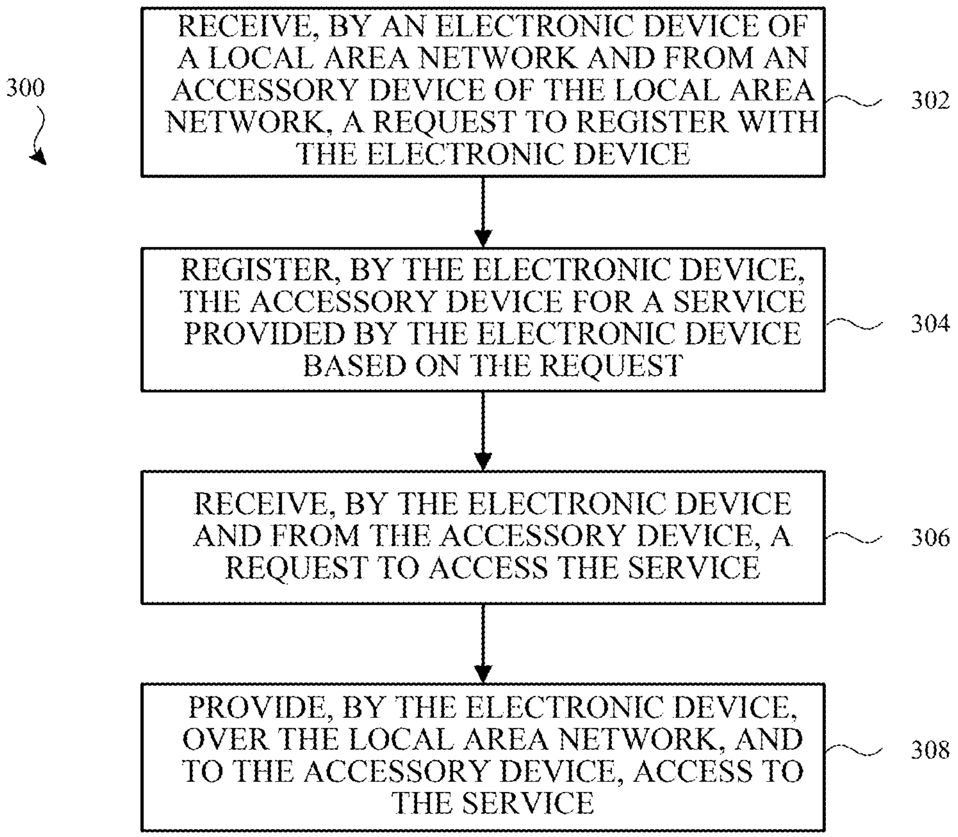
FIG. 3 illustrates an example process for device interoperability in a local area network, in accordance with one or more implementations.

FIG. 3 illustrates an example process 300 for device interoperability in a local area network, in accordance with one or more implementations. For explanatory purposes, the process 300 is primarily described herein with reference to the resident electronic device 112 and the accessory electronic device 104 of FIG. 1. However, the process 300 is not limited to the resident electronic device 112 and the accessory electronic device 104, and one or more blocks (or operations) of the process 300 may be performed by one or more other components and/or other suitable devices (e.g., any of the resident electronic devices 102 and/or the accessory electronic devices 104-110). Further, for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

At block 302, the resident electronic device (e.g., the resident electronic device 112) may receive, from the accessory electronic device (e.g., the accessory electronic device 104), a request to register with the resident electronic device. Both the resident electronic device and accessory electronic device may operate within the same local network (e.g., LAN 114).

The registration may be initiated by, for example, a trigger event or a request transmission. In some implementations, when the accessory electronic device is powered on or introduced to the local network, the accessory electronic device may initiate a registration request to the resident electronic device. The registration request could be prompted by factors such as first-time setup, factory reset, or periodic re-authentication requirements. In other implementations, the accessory electronic device broadcasts or directly sends a specific registration request signal. The signal may include device information such as a device ID, device type, manufacturer details, authentication token, and/or the like.

The resident electronic device may access, detect, or otherwise receive the request. For example, the resident electronic device may continuously monitor the local network for registration requests and, upon detecting a request, may capture the request data and initiate a registration process. Upon receiving a request, the resident electronic device may validate the request to determine the authenticity and compatibility of the accessory electronic device. Validation may include checking against a list of supported devices, verifying the manufacturer details, verifying the user account of the accessory electronic device is the same as the user account of the resident electronic device, and/or validating a preliminary authentication token. Upon validating the accessory electronic device, the resident electronic device may send a response back to the accessory electronic device, such as an acknowledgment if the registration is successful or an error message detailing the reason for registration failure.

At block 304, the resident electronic device may register the accessory electronic device for one or more services (referred to as a single service for purposes of the discussion of process 300). The resident electronic device may register the accessory electronic device for a particular service based on the request. For example, the request may include information such as a service ID, device credentials, or any parameters relating to a service, where the services may provide functionalities such as information access, device control, notifications, payments, and/or the like.

Registering the accessory electronic device with the service may include updating a service registry within the resident electronic device, which may be shared with the other electronic devices in the local network and/or other devices associated with the same user account. Registering the accessory electronic device may also or instead include providing particular configurations and/or personalized settings to the accessory electronic device. If the registration is successful, the resident electronic device may send a confirmation response to the accessory electronic device and/or the service becomes active for the accessory electronic device, enabling the accessory electronic device to utilize the service as per any defined protocols or rules of the service and/or the resident electronic device. In some implementations, the resident electronic device can manage service registration dynamically, allowing for updates, modifications, and/or revocation based on user commands, system policies, user activity, or other trigger(s).

Services may include device discovery that allows the accessory electronic device to identify and communicate with other devices (e.g., accessory electronic devices) within the local network, data synchronization services that allow the accessory electronic device to receive real-time updates and/or status information about home state/activity (e.g., user arriving, user leaving, etc.), other accessory electronic devices or external data sources (e.g., temperature, weather conditions, clean energy usage, and the like), control command services that allow the accessory electronic device to issue commands to another accessory electronic device for coordinating settings and/or operations, notification services that allow the accessory electronic device to send and/or receive notifications based on predefined criteria such as detected movement or changes in temperature, payment services that allow the accessory electronic device to initiate a payment on a resident electronic device (e.g., a money transfer request on a smartphone for user approval), automation/scheduling services that allow the accessory electronic device to perform actions automatically based on schedules, preferences, and/or triggers, energy management services that allow the accessory electronic device to modify (e.g., optimize) energy consumption, data storage services that allow the accessory device to provide storage for other devices and/or utilize other devices on the local network (and/or in the cloud) for storage, location services that allow the accessory device to receive and/or provide information representing a location in which it is located, weather services that allow the accessory device to receive and/or provide weather information (e.g., humidity, temperature, UV index, and the like), time services that allow the accessory device to receive and/or provide time information (e.g., sunrise and sunset), and/or the like.

In some implementations, the service(s) may be activated and/or deactivated after the accessory electronic device has registered for the service(s). The resident electronic device may include a user interface (e.g., visual interface, speech-based interface, and the like) for activating and/or deactivating one or more services for the accessory electronic device. For example, the smart speaker may register for a service to be able to receive emergency notifications (e.g., Wireless Emergency Alerts (WEA)) and the user may tell a virtual assistant of a home hub to deactivate the service on the smart speaker and/or on one or more accessory devices. The resident electronic device may cause a user interface to be included on another electronic device, for example, for activating and/or deactivating one or more services for the accessory electronic device. For example, an accessory electronic device, such as an appliance, may notify a resident electronic device, such as a smart speaker, of an error necessitating repairs, and the smart speaker may relay the error to another electronic device, such as a smartphone, to provide a user interface prompting the user to initiate a service request with the manufacturer of the accessory electronic device.

At block 306, the resident electronic device may receive from the accessory electronic device a request to access the service. The request may include, for example, an identifier of the service, any relevant parameters, credentials, and the like. Upon receiving the request, the resident electronic device may perform one or more security checks, for example, to authenticate the accessory electronic device and verify that the accessory electronic device has the appropriate permissions to access the requested service. Authenticating the accessory electronic device and/or verifying the permissions of the accessory electronic device may include, for example, validating security tokens (e.g., digital certificates or passwords), determining whether the accessory electronic device meets any prerequisites for accessing the service, and the like.

At block 308, the resident electronic device may provide to the accessory electronic device, over the local network, access to the service. Providing access to the service may include obtaining information based on the service. For example, if the service includes data synchronization with another accessory electronic device, the resident electronic device may obtain real-time updates and/or status information about the other accessory electronic devices, which may be provided to the accessory electronic device. As another example, if the service includes energy management, the resident electronic device may obtain data relating to the home's energy usage (e.g., grid utilization, clean energy usage, and the like) from an external data source (e.g., the server 118).

Providing access to the service may also include determining an activity state of the home. Activity states may be abstractions of groups of settings and/or rules that outline how one or more resident and/or accessory electronic devices should behave under different conditions based on factors such as user preferences (e.g., temperature, renewable energy usage, noise), internal conditions (e.g., home variables such as whether the home is occupied or unoccupied), external conditions (e.g., time and weather), and/or predictive elements (e.g., the time the user is expected to be home, the time a device may complete charging). For example, for a "home" activity state, a resident electronic device may indicate to accessory electronic devices that the user prefers low noise and a set temperature so that, when the home is at an "away" activity state, noisy accessory devices may perform routine operations (e.g., a dishwasher cycle) and the thermostat may cause the furnace to begin adjusting the temperature such that the temperature is at the set temperature when the activity state is anticipated to return to the "home" activity state. Activity states may be created by direct action (e.g., manual instruction, triggers, etc.) and/or inferred from one or more signals (e.g., GPS signals, sensor signals, etc.) of one or more resident and/or accessory electronic devices.

For example, the resident electronic device may receive one or more signals from one or more other resident electronic devices (e.g., smartphone), accessory electronic devices (e.g., motion sensor), and/or external sources (e.g., calendar of a user) and determine (e.g., via heuristics, a machine learning model, or any other technique) an activity state. Similarly, activity states may be changed from one to another by direct action (e.g., manual instruction, triggers, etc.) and/or inferred from one or more signals (e.g., GPS signals, sensor signals, etc.) of one or more resident and/or accessory electronic devices, thereby turning the home into a responsive environment that can adjust to the habits of the user. For example, a "home" activity state may be triggered when a smartphone connects to the home network (e.g., LAN 114) and an "away" activity state may be triggered when the smartphone disconnects from the home network.

Providing access to the service may also include generating a notification based on the obtained information and/or the determined activity state. For example, the information may indicate that the power grid supplying energy to the home is utilizing below a threshold amount of clean energy and the activity state of the home may indicate a preference for the home to be in a low power setting (e.g., an eco setting). In which case, the notification may be an indication to the accessory electronic devices registered for an energy management service, for example, that the power grid is utilizing less than a threshold amount of clean energy. The notification may also or instead be a command or recommendation that the accessory electronic devices registered for the energy management service, for example, enter a low power setting, which the accessory electronic devices may execute or consider.

Providing access to the service may also include providing the notification to the accessory electronic device for modifying an attribute of the accessory electronic device. An attribute of the accessory electronic device may include a setting, configuration, activity state, services registered, variable, information stored, or any other characteristic of the accessory electronic device. For example, if the accessory electronic device is a thermostat registered for a clean energy service and the home is in an eco setting, when the accessory electronic device receives an indication that the power grid is utilizing less than a threshold amount of clean energy, the accessory electronic device may, for example, log the indication, change the temperature such that less energy is utilized, power off, and/or register for another service (e.g., a service allows the thermostat to provide indications to the user for notifying the user that the temperature setting should be changed).

In some implementations, process 300 may also include, in response to providing the notification to the accessory electronic device, receiving a signal, command, indication, or any other feedback from the accessory electronic device. The feedback may indicate a status of the accessory electronic device with respect to the notification. For example, if the thermostat changed its temperature setting in response to a notification that directed the thermostat to change its temperature based on the power grid, the thermostat may provide feedback to the resident electronic device indicating that it changed its temperature. The feedback may also or instead include one or more commands for the resident electronic device. For example, if the air conditioner is going into a low power setting to reduce the home's overall energy consumption, the air conditioner may tell the resident electronic device to notify, advise, or command one or more fans in the house to turn on in order to keep the house cool.

In some implementations, process 300 may also include executing a system-level process based on the status of the accessory electronic device. The actions described with respect to process 300 may be performed at the system level without the need for applications. This way, for example, the process 300 may appear to the user of a resident electronic device as a unified interface on the device. Similarly, actions performed by the accessory electronic devices responsive to the actions described with respect to process 300 may be performed without the need for applications. For example, actions may be performed by the accessory electronic device as instructed by its operating system, firmware, and the like.

In one or more implementations, the resident electronic device may receive information from one or more other devices associated with the user and may relay such information to one or more of the accessory electronic devices. For example, a user's smart phone may notify the resident electronic device when the user is leaving work and may provide the resident electronic device with an expected arrival time of the user. The resident electronic device may relay such information to a smart thermostat which may adjust the temperature of the home to reach a pre-set level that coincides with the user's arrival.

In one or more implementations, a user of the home network environment may configure one or more settings and/or preferences that may be implemented throughout the home network environment, such as when the user is detected as being within the home (e.g., via computer vision), and/or when the user is expected to enter the home. For example, a user can set a preference for money savings over maximum comfort, silent heating/cooling over forced air, and the like. In one or more implementations, when multiple users in the home have set different preferences and/or settings, the resident electronic device may attempt to reconcile a mean and/or lowest common denominator across the user preferences.

Figure 4:
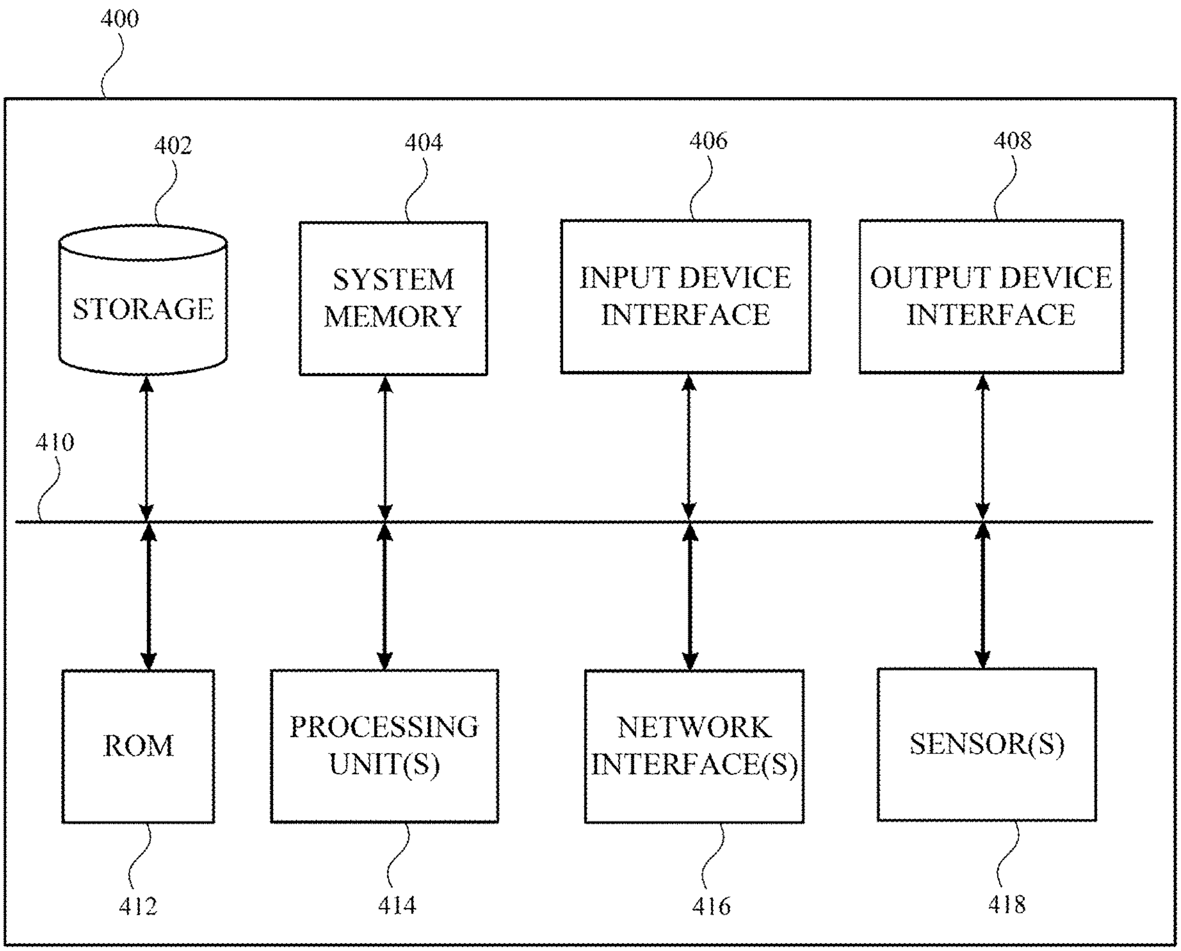
FIG. 4 illustrates an example electronic system with which aspects of the subject technology may be implemented in accordance with one or more implementations.

FIG. 4 illustrates an electronic system 400 with which one or more implementations of the subject technology may be implemented. The electronic system 400 can be, and/or can be a part of, one or more of the resident electronic devices 102, 112, the accessory electronic devices 104-110, and/or the server 118 shown in FIG. 1. The electronic system 400 may include various types of computer-readable media and interfaces for various other types of computer-readable media. The electronic system 400 includes a bus 410, one or more processing unit(s) 414, a system memory 404 (and/or buffer), a ROM 412, a permanent storage device 402, an input device interface 406, an output device interface 408, one or more sensor(s) 418, and one or more network interfaces 416, or subsets and variations thereof.

The bus 410 collectively represents all system, peripheral, and chipset buses that communicatively connect the numerous internal devices of the electronic system 400. In one or more implementations, the bus 410 communicatively connects the one or more processing unit(s) 414 with the ROM 412, the system memory 404, and the permanent storage device 402. From these various memory units, the one or more processing unit(s) 414 retrieves instructions to execute and data to process in order to execute the processes of the subject disclosure. The one or more processing unit(s) 414 can be a single processor or a multi-core processor in different implementations.

The ROM 412 stores static data and instructions that are needed by the one or more processing unit(s) 414 and other modules of the electronic system 400. The permanent storage device 402, on the other hand, may be a read-and-write memory device. The permanent storage device 402 may be a non-volatile memory unit that stores instructions and data even when the electronic system 400 is off. In one or more implementations, a mass-storage device (such as a magnetic or optical disk and its corresponding disk drive) may be used as the permanent storage device 402.

In one or more implementations, a removable storage device (such as a floppy disk, flash drive, and its corresponding disk drive) may be used as the permanent storage device 402. Like the permanent storage device 402, the system memory 404 may be a read-and-write memory device. However, unlike the permanent storage device 402, the system memory 404 may be a volatile read-and-write memory, such as random access memory. The system memory 404 may store any of the instructions and data that one or more processing unit(s) 414 may need at runtime. In one or more implementations, the processes of the subject disclosure are stored in the system memory 404, the permanent storage device 402, and/or the ROM 412. From these various memory units, the one or more processing unit(s) 414 retrieves instructions to execute and data to process in order to execute the processes of one or more implementations.

The bus 410 also connects to the input device interface 406 and output device interface 408. The input device interface 406 enables a user to communicate information and select commands to the electronic system 400. Input devices that may be used with the input device interface 406 may include, for example, alphanumeric keyboards and pointing devices (also called "cursor control devices"). The output device interface 408 may enable, for example, the display of images generated by electronic system 400. Output devices that may be used with the output device interface 408 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 410 also connects to sensor(s) 418. The sensor(s) 418 may include a location sensor, which may be used in determining device position based on positioning technology. The sensor(s) 418 may also include various types of sensors that can measure different physical or environmental parameters such as temperature sensors, humidity sensors, motion sensors, light sensors, sound sensors, and air quality sensors. Temperature sensors (e.g., thermistors, thermocouples, and infrared sensors) can measure the ambient temperature of a room or an object and can be used for adjusting heating or cooling systems, monitoring food storage, detecting fire or smoke, and the like. Humidity sensors (e.g., capacitive, resistive, or thermal sensors) can measure the relative humidity of the air and can be used for controlling a dehumidifier or humidifier, preventing mold growth, improving indoor air quality, and the like. Motion sensors (e.g., passive infrared (PIR), ultrasonic, microwave, and camera-based sensors) can detect the presence or movement of people or objects and can be used for security, lighting, occupancy detection, gesture recognition, and the like. Light sensors (e.g., photodiodes, phototransistors, and color sensors) can measure the intensity or color of light and can be used for adjusting the brightness or color temperature of lighting, creating ambient scenes, detecting daylight or night time, and the like. Sound sensors (e.g., microphones, piezoelectric sensors, and vibration sensors) can measure the sound level or frequency of the sound and can be used for noise detection, voice recognition, music control, and the like. Air quality sensors (e.g., electrochemical, metal oxide, optical, and laser sensors) can measure the concentration of various gases or particles in the air and can be used for detecting harmful substances such as carbon monoxide, volatile organic compounds, smoke, dust, and the like.

Finally, as shown in FIG. 4, the bus 410 also couples the electronic system 400 to one or more networks and/or to one or more network nodes through the one or more network interface(s) 416. In this manner, the electronic system 400 can be a part of a network of computers (such as a local area network, wide area network, mesh network, or a network of networks, such as the Internet). Any or all components of the electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As described above, one aspect of the present technology is the gathering and use of data available from specific and legitimate sources for responding to a user request within a home environment. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for responding to a user request within a home network environment. Accordingly, use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of responding to a user request to control an accessory electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

receiving, by an electronic device connected to a local area network and from an accessory electronic device connected to the local area network, a request to register with the electronic device;

registering, by the electronic device, the accessory electronic device for a service provided by the electronic device based on the request;

receiving, by the electronic device and from the accessory electronic device, a request to access the service;

determining, by the electronic device, in response to receiving the request to access the service and after registering the accessory electronic device for the service, an activity state indicating a condition of a home network environment associated with the local area network, based at least in part on signals received by the electronic device from electronic devices other than the accessory electronic devices; and providing, by the electronic device, over the local area network, and to the accessory electronic device, access to the service based in part on the activity state.

2. The method of claim 1, wherein the electronic device is connected to a wide area network and the accessory electronic device is not directly connected to the wide area network.

3. The method of claim 1, wherein the accessory electronic device is configured to communicate exclusively via peer-to-peer communications.

4. The method of claim 1, wherein the providing access to the service comprises:

obtaining, by the electronic device, information based on the service;

generating, by the electronic device, a notification based on the information and the activity state; and providing, by the electronic device and to the accessory electronic device, the notification for modifying an attribute of the accessory electronic device.

5. The method of claim 4, wherein the information is obtained from another accessory electronic device of the local area network.

6. The method of claim 4, wherein the information is obtained from a remote electronic device external to the local area network, the remote electronic device not being accessible by the accessory electronic device.

7. The method of claim 4, wherein the notification includes a command to be executed by the accessory electronic device.

8. The method of claim 4, further comprising:

receiving, responsive to providing the notification to the accessory electronic device, feedback from the accessory electronic device indicating a status of the accessory electronic device with respect to the notification.

9. The method of claim 8, further comprising:

executing, by the electronic device, a system-level process based on the status of the accessory electronic device with respect to the notification.

10. The method of claim 1, wherein providing access to the service comprises at least one of:

providing messaging functionality to the accessory electronic device, providing payment functionality to the electronic device, providing notification functionality to the electronic device, providing control functionality of another accessory electronic device to the accessory electronic device, or providing monitoring functionality of another accessory electronic device to the accessory electronic device.

11. An electronic device comprising:

a memory; and at least one processor configured to:

receive, over a local area network and from an accessory electronic device connected to the local area network, a request to register with the electronic device;

register the accessory electronic device for a service provided by the electronic device based on the request;

receive, from the accessory electronic device, a request to access the service;

determine, in response to receipt of the request to access the service and after registration of the accessory electronic device for the service, an activity state indicating a condition of a home network environment associated with the local area network, based at least in part on signals received by the electronic device from electronic devices other than the accessory electronic device; and provide, over the local area network and to the accessory electronic device, access to the service based at least in part on the activity state.

12. The electronic device of claim 11, wherein the providing access to the service comprises:

obtaining, by the electronic device, information based on the service;

generating, by the electronic device, a notification based on the information and the activity state; and providing, by the electronic device and to the accessory electronic device, the notification for modifying an attribute of the accessory electronic device.

13. The electronic device of claim 12, wherein the information is obtained from another accessory electronic device of the local area network.

14. The electronic device of claim 12, wherein the information is obtained from a remote electronic device external to the local area network, the remote electronic device not being accessible by the accessory electronic device.

15. The electronic device of claim 12, wherein the notification includes a command to be executed by the accessory electronic device.

16. The electronic device of claim 12, wherein the at least one processor is further configured to:

receive, responsive to providing the notification to the accessory electronic device, feedback from the accessory electronic device indicating a status of the accessory electronic device with respect to the notification.

17. The electronic device of claim 16, wherein the at least one processor is further configured to:

execute, by the electronic device, a system-level process based on the status of the accessory electronic device with respect to the notification.

18. A non-transitory machine readable medium storing instructions that, when executed by one or more processors, cause the one or more processors to perform operations comprising:

receiving, by an electronic device connected to a local area network and from an accessory electronic device connected to the local area network, a request to register with the electronic device;

registering, by the electronic device, the accessory electronic device for a service provided by the electronic device based on the request;

receiving, by the electronic device and from the accessory electronic device, a request to access the service;

determining, by the electronic device, in response to receiving the request to access the service and after registering the accessory electronic device for the service, an activity state indicating a condition of a home network environment associated with the local area network, based at least in part on signals received by the electronic device from one or more electronic devices other than the accessory electronic device; and providing, by the electronic device, over the local area network, and to the accessory electronic device, access to the service based at least in part on the activity state.

19. The non-transitory machine readable medium of claim 18, wherein the activity state comprises at least one of a home state, an away state, or a sleep state.

20. The non-transitory machine readable medium of claim 19, wherein the signals comprise at least one of: a connection of another electronic device to the local area network, a disconnection of the another electronic device from the local area network, or one or more sensor signals from the another electronic device, and wherein the activity state indicates user presence in or user absence from the home network environment.

* * * * *